United States Patent

Uyesugi et al.

[11] Patent Number: 5,949,777
[45] Date of Patent: Sep. 7, 1999

[54] WIRELESS COMMUNICATION PROCESSOR SYSTEM

[75] Inventors: George Uyesugi, 514 N. Foothill Rd., Beverly Hills, Calif. 90210; Douglas A. Walker, Hermosa Beach, Calif.

[73] Assignee: George Uyesugi, Beverly Hills, Calif.

[21] Appl. No.: 08/386,707

[22] Filed: Feb. 10, 1995

Related U.S. Application Data

[63] Continuation-in-part of application No. 08/237,619, May 3, 1994.

[51] Int. Cl.⁶ .......................................................... H04B 7/24
[52] U.S. Cl. ............................................................... 370/345
[58] Field of Search ................................. 370/95.1, 95.2, 370/95.3, 79, 80, 82, 83, 85.2, 94.1, 97, 110.1, 69.1, 120, 121, 71, 75, 76, 348, 277, 278, 279, 293, 310, 315, 316, 319, 320, 321, 326, 260, 261, 262, 263, 266; 455/343, 7, 11.1, 73, 84, 88, 12.1, 69; 375/222

[56] References Cited

U.S. PATENT DOCUMENTS

| | | | |
|---|---|---|---|
| 4,056,779 | 11/1977 | Toler | 455/11.1 |
| 4,528,656 | 7/1985 | Morais | 370/69.1 |
| 4,639,914 | 1/1987 | Winters | 455/54.1 |
| 5,200,951 | 4/1993 | Grau et al. | 370/261 |
| 5,241,542 | 8/1993 | Natarajan et al. | 370/95.3 |
| 5,271,007 | 12/1993 | Kurahashi et al. | 370/85.1 |
| 5,282,204 | 1/1994 | Shpancer et al. | 370/95.1 |
| 5,349,694 | 9/1994 | Kawano et al. | 455/11.1 |
| 5,371,734 | 12/1994 | Fischer | 370/95.1 |
| 5,551,066 | 8/1996 | Stillman et al. | 455/69 |

*Primary Examiner*—Huy D. Vu
*Attorney, Agent, or Firm*—Patrick F. Bright

[57] ABSTRACT

A wireless communication processor system includes a wireless data/control commands transmission/reception unit, buffer memory for storing wirelessly received data and control commands, buffer memory for storing data and control commands for wireless transmission, buffer memory for receiving and storing data and control commands from host units such as computers and printers, buffer memory for storing data and control commands to be transmitted from the processor to a host unit, and a system for establishing a link with other wireless communication processors for transmitting data and control commands to, or for receiving data and control commands from, the other processors.

32 Claims, 11 Drawing Sheets

FIG. 6A

FRAME FORMAT BETWEEN HOST AND WCP (CONTROL MODE)

BYTE 0: (FF) HEX
1: (8F) HEX
2: OPERATION CODE
3: BUFFER ADDRESS (LOCAL ADDRESS)
4: NUMBER OF DATA BYTES
5: DATA
*
*
*

FIG. 6B

FRAME FORMAT BETWEEN THE WCPs (WIRELESS FORMAT)

BYTE 0: HEADER
1: MESSAGE NUMBER
2: Dx ADDRESS
3: NUMBER OF DATA BYTES
4: LOWER BYTE OF Dx ADDRESS
5: OPERATION CODE
6: STATUS
7: DATA
8: . . .
*
*
n: CRC-16 HIGH BYTE
n + 1 : CRC-16 LOW BYTE

WHERE n= NUMBER OF DATA BYTES + 6

WIRELESS COMMUNICATION PROCESSOR SYSTEM

This application is a continuation-in-part of pending application Ser. No. 08/237,619 filed May 3, 1994, for "WIRELESS COMMUNICATION PROCESSOR SYSTEM" by George J. Uyesugi and Douglas A. Walker.

BACKGROUND OF THE INVENTION

This invention relates to a wireless communication processor (WCP) system that includes two or more of such WCPs for wirelessly transmitting and receiving data and control commands among one or more host units, such as computers, printers, or personal communicators on a time division basis; each WCP is either connected to or embedded in a host unit. These WCPs include: means for receiving and storing, in WCP memory, data and control commands from a host unit connected to a WCP; means for storing and transmitting data and control commands to a host unit connected to the WCP; a data and control processing system that is connected to the memory means that communicate with the host unit and to means for wireless transmission and receipt of data and control commands; means for storing data and control commands for transmission to one or more other WCPs connected to other host units; means for transmitting data and control commands wirelessly to one or more other WCPs; and means for receiving and storing data and control commands received wirelessly from one or more other WCPs.

In all embodiments, the invention also comprises a plurality of host units such as computers, printers, personal digital assistants, personal communicators and display devices, each including a WCP wherein at least one of the WCPs is a Master Controller (WCP MC) for the entire system. One or more of the WCPs wirelessly communicates data or control commands, or both, to or among one or more of the other WCPs, and the host units attached to them, under control of the data and control processing system in each of the WCPs. The data and control processing system includes means for receiving data and control commands from a host and for transmitting data and control commands to host units through memory buffers. The system also includes means for changing: the default data length of a frame and a default destination for use in a pass through mode; WCP unit addresses; WCP user codes; WCP local codes; WCP broadcast group address; and WCP transmission baud rates; WCP RF channel numbers (corresponding to a data channel frequency band) consisting of one primary carrier and zero or more secondary carriers (subchannels). The secondary carrier is used as a dedicated subchannel by which point to point communication is established without the usual overhead associated with the primary carrier communication. In this way true multipoint to multipoint communication can be accomplished by the use of the primary carrier coincident with the use of one or more secondary carriers.

Importantly, the system includes means for changing the operation mode of any WCP in the system from input or output mode to output or input mode, depending on the host it's connected to.

Each WCP in the system also includes: means for sending broadcast data to another WCP and means for transferring control command to another WCP to create a communication link between that WCP and one or more other WCPs. Each WCP includes means for selecting or de-selecting itself to be master controller of one or more other WCPs. Each WCP includes means to check received data and control commands for proper format, proper address and proper system access, and then to transmit the data and control commands to a connected host unit.

Each WCP in the system also includes means to establish a transmission link with one or more other WCPs, or to terminate such a link via the primary carrier. Each WCP also includes means to set up a communication link on a subchannel with any other WCP in the system that is not currently involved in primary link communication. Each WCP includes means for transmitting communication link setup commands to one or more other WCPs for thereafter transmitting one or more frames of data or control commands to the one or more other WCPs, and finally for terminating the link. A WCP acting as master controller transmits control commands to other WCPs to establish and control communication links between two or more other WCPs.

The system also includes means for monitoring the master controller WCP's activities, means for detecting headers on data and control commands received from other WCPs and associated host units, means for storing data or control commands in input buffers for an associated host unit, and means for sending data or control commands to a host unit associated with a WCP.

BRIEF DESCRIPTION OF THE DRAWINGS

FIG. 6A shows a frame format for data to be communicated between a host and a preferred embodiment of the WCP operating in the control mode;

FIG. 6B shows a frame format for data to be between two or more preferred embodiments of the WCP;

DESCRIPTION OF THE PREFERRED EMBODIMENTS

Figure 1:
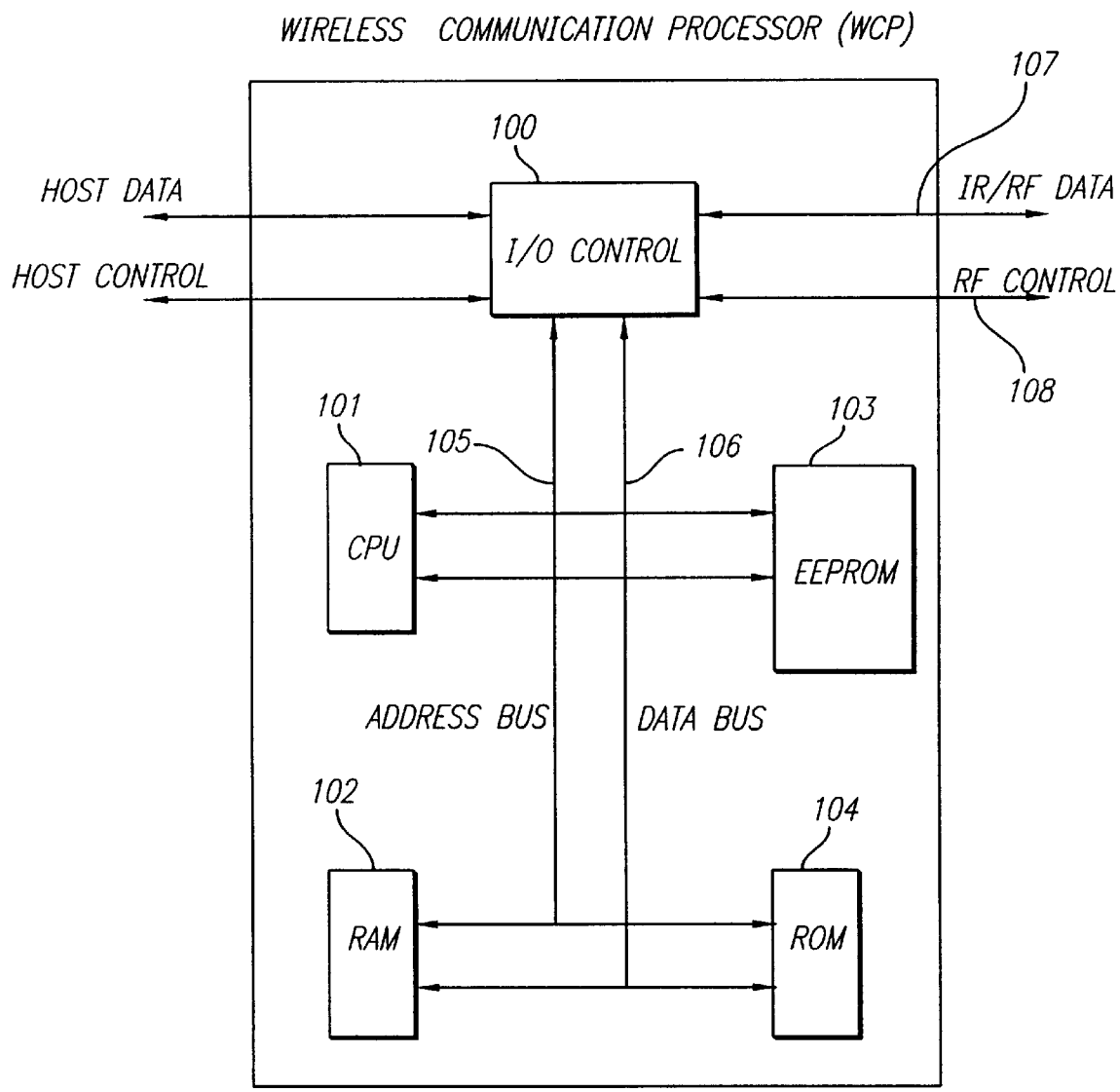
FIG. 1 is a block function diagram of a preferred embodiment of the WCP of this invention.
Figure 3:
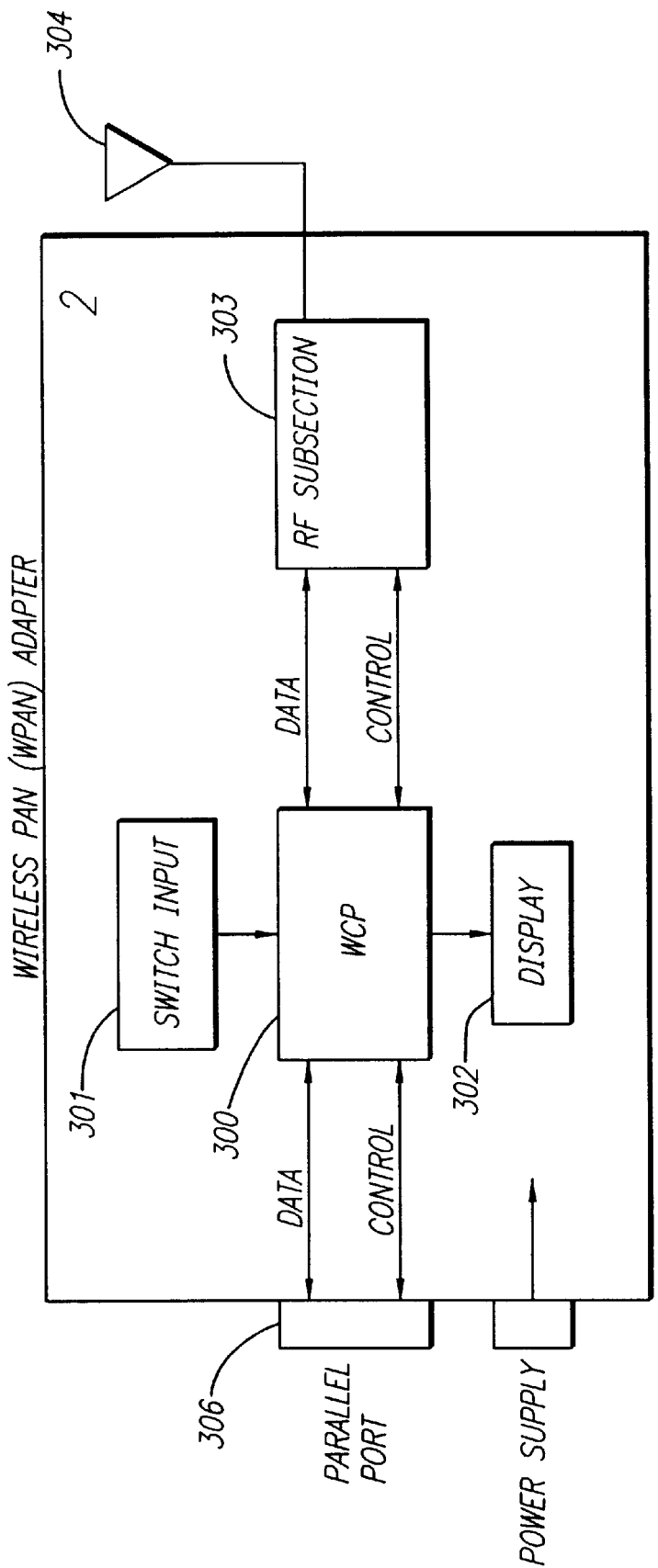
FIG. 3 is a physical description of a preferred embodiment of the wireless PAN adapter, including a preferred embodiment of the WCP.

FIG. 1 shows a preferred embodiment of the WCP 1. WCP is a device that provides the handshaking and formatting of information between two or more WCPs and hosts. In preferred embodiments, a WCP is embedded within a device such as a printer or a computer. Alternatively, the WCP may be embedded in a wireless personal area network (WPAN) adapter; the WPAN adapter is the first systems embodiment of the WCP as FIG. 3 shows.

WCP 1 includes an input/output control section (I/O) 100, a central processing unit (CPU) 101, a random access memory (RAM) 102, an electrically-erasable, programmable, read-only memory (EEPROM) 103, and a read-only memory (ROM) 104. I/O control block 100 provides the handshaking and timing between all the internal and external devices. Data and commands are routed via I/O 100 to CPU 101 and RAM 102 on path data bus 106.

CPU 101 executes firmware located in ROM 104. Any parameters that are infrequently changed and are non-volatile are stored in EEPROM 103. Such parameters could, for example, include the WCP network address. RAM 102 provides storage for temporary variables and also provides buffer storage areas such as the Tx output buffer. After commands are processed from the Tx host, WCP commands, WCP data, or both, can be formatted in frames by WCP 1, and then sent out for transmission by an infrared or RF system on path 107. Incoming data from the wireless network, whether from an RF network, an IR network, or some other wireless network, is also routed by I/O control 100, and sent to CPU 101 for eventual re-packing of data for host reception and processing.

Figures 1, 2:
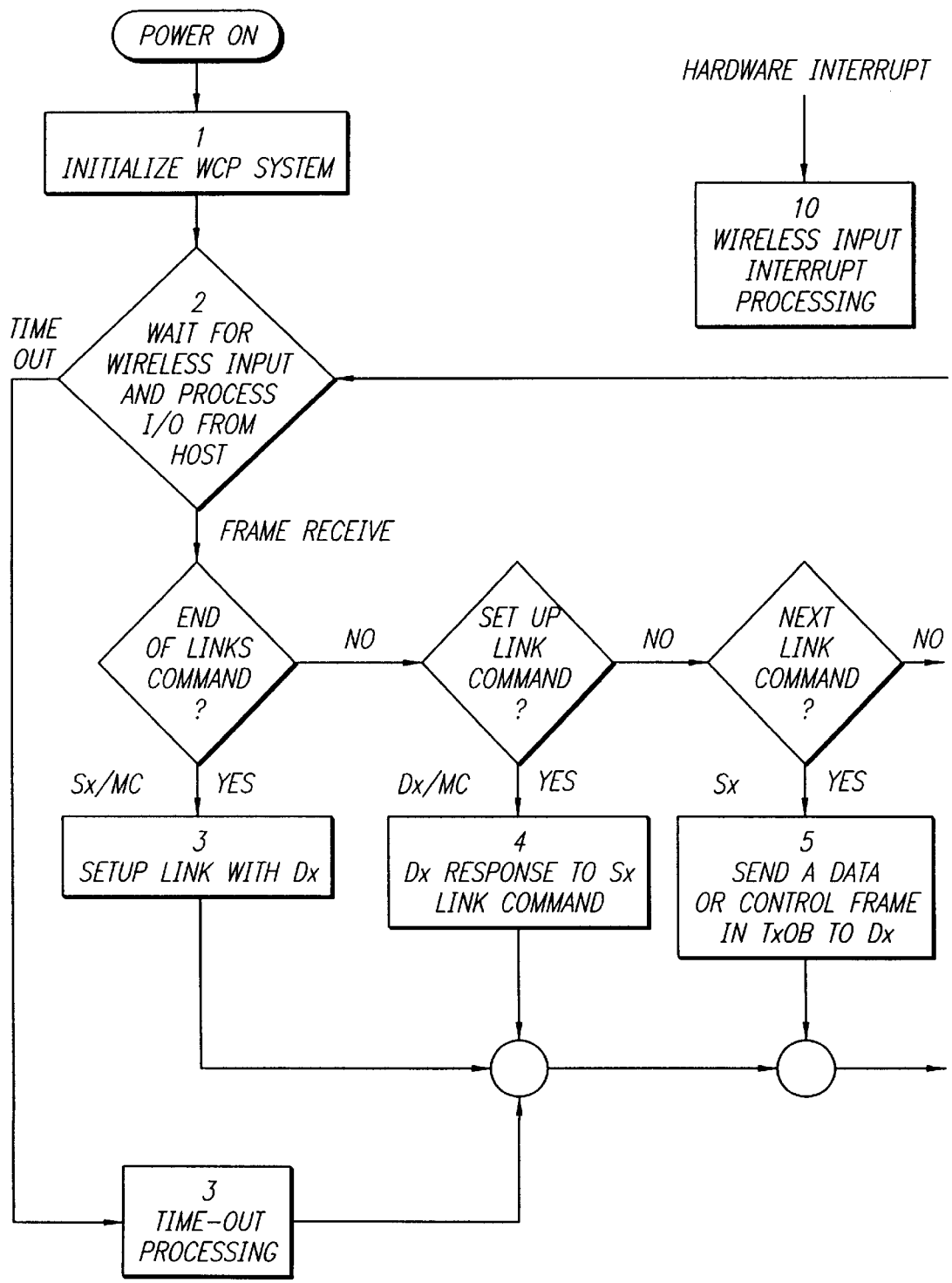
FIG. 2 is a flow chart showing the data and control processing system function of a preferred embodiment of the WCP in formatting and adapting data and control commands for communication to/from one WCP to another; and to/from the host.
Figure 2:
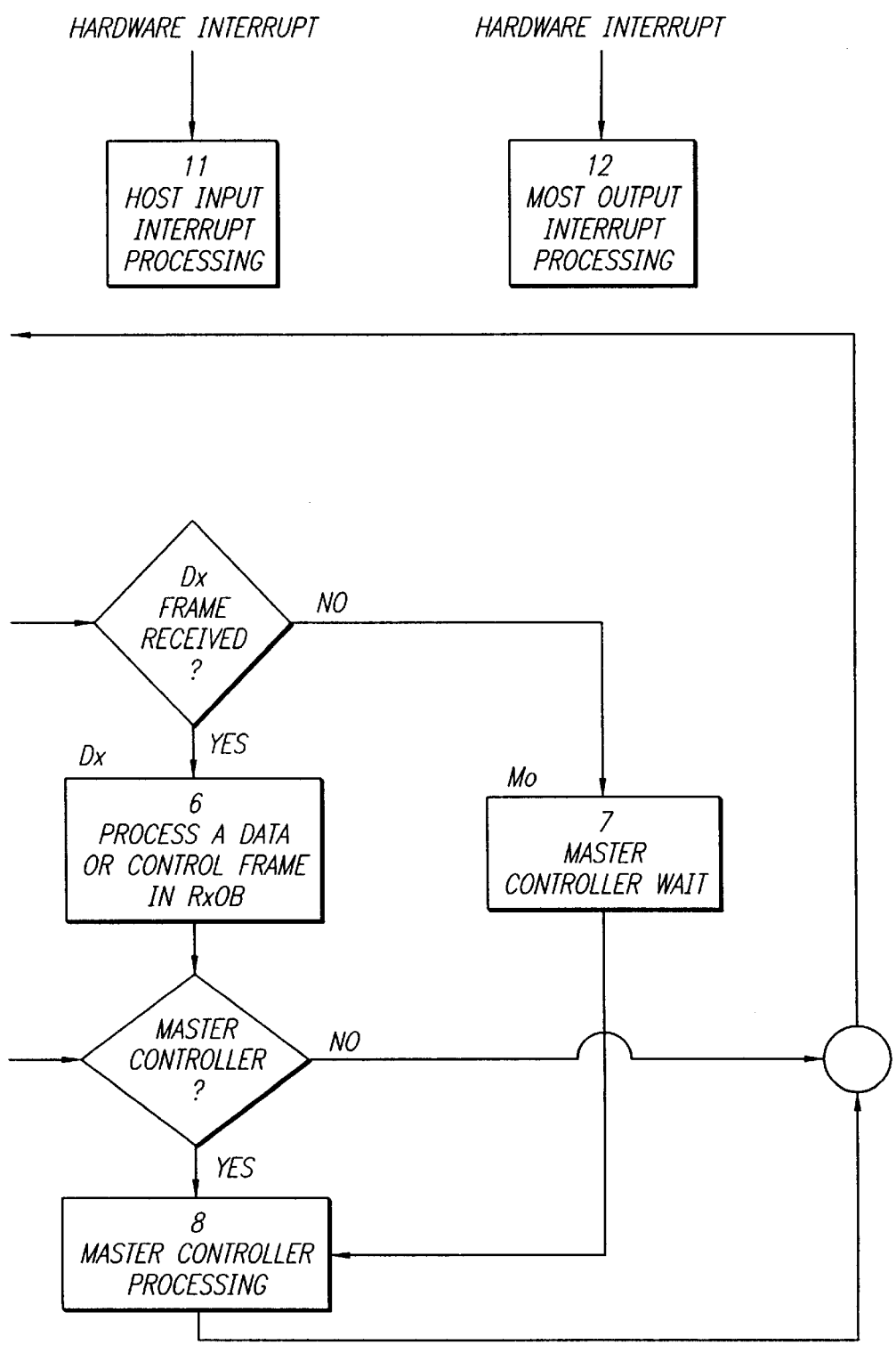

As FIG. 2 shows, when power is supplied to the WCP, it first goes through a self-initialization phase, then through a multi-stage process for receiving and sending data. During initialization (Stage 1), the WCP determines whether it has been connected to a printer type of device or a PC type of device. This is done by sensing logic levels at the parallel port and then comparing them to a table located in memory. If connected to a printer, the WCP sets itself in the output mode (i.e., the WCP looks like a PC to the printer); if connected to a PC the WCP sets itself in the input mode (i.e., the WCP looks like a printer to the PC). If a WCP sends data, it is called an Sx (Source); if it receives data from another WCP, it is called a Dx (Destination). Next, the WCP clears the variable storage area (i.e. RAM). Then it stores loaded data, located in the EEPROM, to the RAM. This data or information includes: security codes, baud rates, the WCP's primary address and channel number, and various default values. The WCP will then configure itself to the correct baud rate. Finally, a log-on request signal is sent to the Master Controller (MC). The Master Controller regulates the command and data traffic flow between WCPs. This signal tells the WCP MC that the WCP has been powered up (activated).

Stage 2 of WCP system operation includes waiting for the RxOB which is a buffer containing a frame of data or control commands received from wireless unit, to be ready for processing. While waiting for the RxOB to be ready, WCP performs various tasks relating to the operation of the WCP, such as various I/O transactions that take place between the host and the WCP if WCP is in input mode. If RxOB is not ready to be processed in a given time period, there is a time out and the system exits Stage 2.

The following events take place in WCP during Stage 2 of WCP system operation. The WCP MC, WCP Sx, and WCP Dx checks to see if any link has been silent for a long period of time. If so, then the link is deleted and all parameters relating to the link are reset. The WCP calculates or detects the start and end of each frame being sent from the host to the TxIB (buffer for the host unit to input data, i.e., a "round robin" buffer for a plurality of frames) in the WCP. The application program in the host inserts a header at the beginning of the data stream. The length of the data, in bytes, has already been predetermined by the host. This byte length number has also been inserted as part of the header. The WCP detects the header, and therefore knows the beginning of the frame. It then extracts the data length number from the header, and counts the number of data bytes to determine where the end of the frame is. This process is repeated for each frame inserted into the buffer (TxIB). The exception to this rule is when running WordPerfect, Lotus or any off-the-shelf application software. Since they cannot be configured to insert a header, the header is inserted by the WCP. WCP must be in Pass Thru Mode to perform the above operations.

The WCP processes the contents of the TxIB. The contents can be data or control commands. For example, a control command might be used to change the WCP's user security code. The WCP sends a status code back to the host after each processed command. The status code goes back to the host via RxOB and HOB (Host Output Buffer is used for data output to the host unit. HOB resolves timing problems associated with outputting to a PC type of host.) If the TxIB contains data to be sent to a remote WCP, the WCP transfers the data to the TxOB. In a subsequent stage, the content of TxOB is sent to a remote WCP via wireless unit.

Activating or terminating an application task in a remote host is a control command. The control command is transferred to the TxOB (an output buffer for wireless data output to a remote WCP), where it remains until it is sent to the destination.

Another example of a command sent from the host to the WCP TxIB is a command to change the system variables of either a local or remote WCP location, such as the default value for data length and WCP Dx (Destination WCP) address. The following variables are stored in the secondary locations: user security code, local code, unit primary address, channel number and baud rate. Secondary location is a feature used when changing any of the above variables. The variables are sent across the link and stored into memory (into a secondary location). Then a command is sent to swap the variables from the secondary to the primary location where they are utilized, assuring synchronization between the WCPs. In other words, there is no loss of data transmission due to one WCP getting ahead of another WCP such as when two users in a link want to change their baud rate. Other commands are: Change the Power Saving Mode; Change the Operation Mode of the WCP by changing to input or output mode; Change to WCP Dx Only; Change to Both Dx/Sx; Change to Disable or Enable Receiving Broadcasts; and, Change to Record Device or to a Sequential Device. The WCP can reset itself or reset a remote WCP by command. The WCP can change broadcast group addresses and can load and execute a program in either a local or remote location.

If the command is for a remote WCP, the command is transferred to TxOB. Also, the WCP can set up or terminate a link. The control command is transferred to the TxOB.

The WCP MC is the only WCP that can broadcast. Broadcast is defined as having one transmitter of information, whereas all other users are receivers only. If the WCP MC originates a broadcast, then data is transferred from the TxIB to the Broadcast Buffer. If another WCP originates data to be broadcast, then data is transferred from the TxIB to the TxOB. This data is eventually sent to the WCP MC for broadcasting.

Another control command allows for remote link up, where a WCP establishes a link between two remote WCPs so that two remote WCPs can communicate with one other. This command is sent to the TxOB. For example, a PC's WCP can establish a link between two printer WCPs, such that one printer's WCP serves as a repeater. In addition to the remote link up capability wherein a WCP can extend its range beyond the network boundary (via the use of the primary carrier), another option allows for two WCPs to communicate on a secondary carrier which is mutually exclusive from the primary carrier. The secondary carrier is within the same frequency band (data channel) as the primary carrier. The MC manages the use of all secondary carriers within a data channel. Using this approach allows for the fastest transfer of data afforded by the protocol and is called Radio Frequency Management Mode (RFMM). Using RFMM allows two or more WCPs to communicate simultaneously with the primary carrier and allows for the WCPs to communicate without having to wait for NLN by the MC. In RFMM Sx and Dx WCPs establish a preliminary link via the primary carrier in the usual manner. This allows for Sx, Dx and MC to know what frequency the secondary carrier is on.

Data transmission by the Sx is thus accomplished as follows: The Sx makes a request of the MC for a secondary carrier by sending a Request for Secondary Carrier Command to the MC. The MC in turns searches its internal look up table for unassigned secondary carriers and assigns one to the requesting Sx. The Sx then requests and establishes a link with the Dx via the primary carrier. The purpose for this is to communicate to the Dx the actual frequency of the secondary carrier that will subsequently be used. After frequency selection is established, data is sent from the Sx via the secondary carrier using the frame format described earlier for the primary carrier. In this way, a dedicated channel for communication can be set up between the Sx and the Dx for faster data transfer without the overhead of waiting for the NLN command by the MC. As the last frame is sent by the Sx, an OP code of 02 is sent to indicate that the last frame of data is being sent. The Sx will then switch from Tx to Rx mode. It is the application program's responsibility to ensure complete data integrity at the Dx by ascertaining whether any frames of data were lost. If it is determined that certain frames of data are missing, the Dx must request the for the missing frames.

In any case, the Sx will expect an acknowledgement of the last frame of data within a timeout period. If no acknowledgement is received by the Sx, the Sx will resend the last frame with OP code 02 and then switch back to Rx mode. The overall data flow is managed by the application program and in this way is similar to an ISO-HDLC.

The Change to Pass Thru Mode control command sets up the WCP to set up a link to the default WCP Dx in the TxOB and sets system variables to Pass Thru Mode.

After the control command is received and if the WCP is in the Pass Thru Mode, it will then change to the Control Mode. If a WCP was already in Control Mode, no action takes place.

The WCP can clear itself from selection as WCP MC. This is called Clear WCP MC Select. Also, any WCP can be selected to be a WCP MC. A WCP can also select single user mode, which means that the WCP becomes a WCP MC; talks to just one WCP Dx; and, this link is the only established link. If there is only one link, i.e., between the WCP MC and WCP Dx, then a WCP MC can eliminate sending the NLN (Next Link Number) or ELT (End of Link Table) frames and other overhead processing. This reduces overhead and allows faster transmission of data.

The WCP can update the EEPROM. This is an advantage because the user need not re-enter data such as user number, etc., every time after power up.

Another event of Stage 2 of the WCP system use is processing the contents of the RxIB. As a frame of data is received, WCP is checked for errors using CRC-16, which is a frame checking method. If an error is detected, the WCP requests sender to send again. WCP also checks for the proper address and if the frame is for the right user. Data is then transferred to the RxOB.

Another event is checking for a time out if the WCP is in Pass Thru Mode. When in Pass Thru Mode there is no way of knowing where the last frame is, and therefore no way of knowing when it will be sent. When the last byte has been received in the buffer and activity ceases for a certain period of time, a time out occurs. When this happens, the WCP will complete the frame so it can be processed. If the WCP is in the input mode and has data in HOB, the WCP will initiate data transfer from HOB to the host.

Stage 3 includes setting up a link between a WCP Sx and a WCP Dx. If the WCP Sx is not the WCP MC, the WCP Sx waits for an ELT (End of Link Table) frame from the WCP MC and responds with a RTL (Request to Link) frame. The WCP MC responds with a RC (Received Confirmed) frame. When WCP Sx detects RC, it sends to WCP Dx a LSU (Link Setup) frame. WCP Dx responds by sending a RC frame (Received Confirmed) to WCP Sx. WCP Sx responds by sending to WCP MC a CC (Command Complete) frame. Upon receiving CC, WCP MC will send to WCP Sx an ALN (Assign Link Number) frame.

If WCP Sx receives either an error code from the WCP MC or no response from the WCP MC, WCP Sx aborts operation immediately and sends the abort frame to the WCP MC. One reason for not receiving any response from the WCP MC could be that the WCP MC had received more than one RTL simultaneously. The collision of RTLs may confuse the WCP MC. Therefore, the WCP MC negates all requests. If WCP Sx receives no response, it selects a random number between 0 and 7, and wait for that number of repeated ELT frames before trying again.

If an WCP Sx is also the WCP MC, then RTL, RC (WCP MC), CC, and ALN are not transmitted because the link is set up internally. Just LSU and RC (WCP Dx) are sent.

When the WCP receives a link establishment command, it enters Stage 4. If a WPC Dx is also the WCP MC, a RC frame is transmitted to WCP Sx. This happens after WCP MC receives LSU from WCP Sx. The WCP also checks to see if it is in the single user mode.

The WCP Dx assigns a local address to the RC frame sent to WCP Sx if none was requested. The WCP Dx also generates an error condition: if all local addresses are busy, if the host is busy, or, if there is an error condition. This error code is sent back in a status code of RC frame. The WCP Dx can also be the MC, in which case it sends the link number to WCP Sx. If the WCP Dx receives an abort command it discontinues operation.

Stage 5 starts when WCP receives a Next Link Number (NLN) command from WCP MC. Once a link has been set up, the WCP Sx is ready to send a frame of data or a control frame. Either kind of frame is hereafter called "data". If data is in the TxOB, it is transmitted to WCP Dx. If TxOB is empty, a NOP (No Operations) command is transmitted to WCP Dx. If WCP Dx sends an error condition in the RC frame, the WCP Sx detects it and checks for error conditions. Every time a frame of data is transmitted, except a NOP, the host is sent an execution status frame.

When a WCP Dx does not receive a data frame that was sent or if the WCP Dx's RxIB is not ready to receive data, the WCP Sx responds by re-sending that frame at the next NLN command. Once WCP Sx exceeds the maximum allowed resend count, the WCP Sx issues a terminate link command. Whenever the WCP Dx receives a data or control frame at RxIB, it is transferred to RxOB as described in reference to Stage 2.

Stage 6 begins if a frame received is for WCP Dx processing. When the frame is processed, the WCP Dx sends a received confirm frame (RC) to WCP Sx with a status code. However, if a frame received is from broadcast, WCP does not send RC.

Some of the processing required for a control frame received from the wireless unit is similar to the processing required for a control frame received from the host, as explained in reference to Stage 2. The following control frame commands are similar to those received from the host: (a) change system variables; (b) use secondary variables; (c) change power saving mode; (d) change operation mode; (e) reset WCP; (f) change broadcast group address; and (g) load and execute.

If a frame contains application data, not control data, WCP Dx initiates transfer of data from RxOB to the host. However, if WCP Dx is configured for the input mode, data is sent from RxOB to HOB (Host Output Buffer) and then to the host. HOB contains a larger buffer which is required when sending data to a PC type of device.

One of the commands from the WCP Sx is to request the WCP Dx to send its status information to WCP Sx. This command is useful for security, maintenance and trouble shooting of a WCP unit and a Personal Area Network (PAN). (This also occurs in Stage 2).

There are three different link termination functions performed, depending on the data that is received: First, WCP performs resetting of link variables and deleting the WCP Sx address from the WCP Dx link table. Second, if WCP is a WCP MC, it clears any WCP Sx and WCP Dx addresses from the link tables and resets or readjusts WCP MC variables. The command received is for initiating the terminate link command on the local address specified by the WCP Sx. The WCP Sx stores a Request to Terminate a Link command to WCP MC in TxOB to be sent at the time of the next NLN command.

If WCP is WCP MC and receives a request broadcast frame, the WCP MC transfers the broadcast data from RxOB to Broadcast Buffer (BB) for later transmission. The data also goes to the host if the broadcast received in WCP is enabled.

A WCP Sx can request WCP $Dx_1$ to link up with another WCP $Dx_2$. WCP $Dx_1$ initiates link up by creating a control frame in TxOB using the data received from WCP Sx. The frame is sent to the WCP MC when next end of link table (ELT) command is detected.

If in Stage 7, WCP must be WCP MC. WCP is in a mode waiting for one of two things to happen. The first is to receive a command complete (CC) from the WCP Sx. If there is no frame received within a given time period, WCP times out and WCP increments the link error counter. When either of these conditions happens, WCP exits from Stage 7.

If in Stage 8, WCP must be the MC. First, WCP checks for any more links in the link table. If there are more links, WCP sends the next link number frame (NLN) which tells the next WCP Sx to start transmission and exit from this stage. If there are no more links, then WCP checks for any data in the broadcast buffer (BB). If there is data in the BB, WCP broadcasts a frame of data from the BB. Next, WCP sends an end of link table (ELT) frame which tells any WCP Sx to start its linking process.

When a WCP exits Stage 2 with time out, it starts Stage 9, and clears the LED display, denoting that links are momentarily disrupted. If a WCP is a MC and it was waiting for WCP Sx's frame when time out occurred, then, the WCP increments the link error counter.

Stage 10 starts when a byte of data is received in a WCP's wireless receive register, and a hardware interrupt is generated. WCP then transfers a byte of data from the WCP's wireless receive register to the RxIB and exits this stage. As WCP receives a byte of data, the WCP can check for a header. Depending on a wireless unit, this function can be performed either in WCP or in a wireless unit.

Stage 11 starts with a hardware interrupt which is generated whenever the host sends a byte of data to the WCP's host receive register. WCP transfers a byte of data from the WCP's host receive register to the TxIB and exits this stage.

Stage 12 begins with sending a byte of data from the WCP to the host. The host acknowledges the receipt of a data byte by sending an interrupt to the WCP activating this stage. If there are additional bytes of data to be sent, the WCP loads the WCP's host send register. Then, the WCP sends an interrupt to the host and exits. If there is no more data to send, the WCP performs housekeeping and exits. Transfer of data is done either byte by byte, or nibble (half a byte) by nibble, depending on the host and its hardware interface.

FIG. 3 shows the WPAN adapter 2. WPAN adapter 2 includes WCP 300 connected to RF sub-section 303 to provide wireless transmission and reception of information and data from other devices. WPAN parallel port 306 can be connected to a printer or to a host such as a personal computer. When adapter 2 is connected to a PC, adapter 2 is in the input mode. When adapter 2 is connected to a printer, it is in the output mode. Fixed input (e.g., unit address for testing) is provided by switch input block 301. WCP status output is displayed at display output 302. After host data or control commands are processed and formatted by WCP 300, the formatted data and control commands are transmitted from RF sub-section 303 via antenna 304 for receipt at another WPAN adapter or an embedded WCP.

Figure 4:
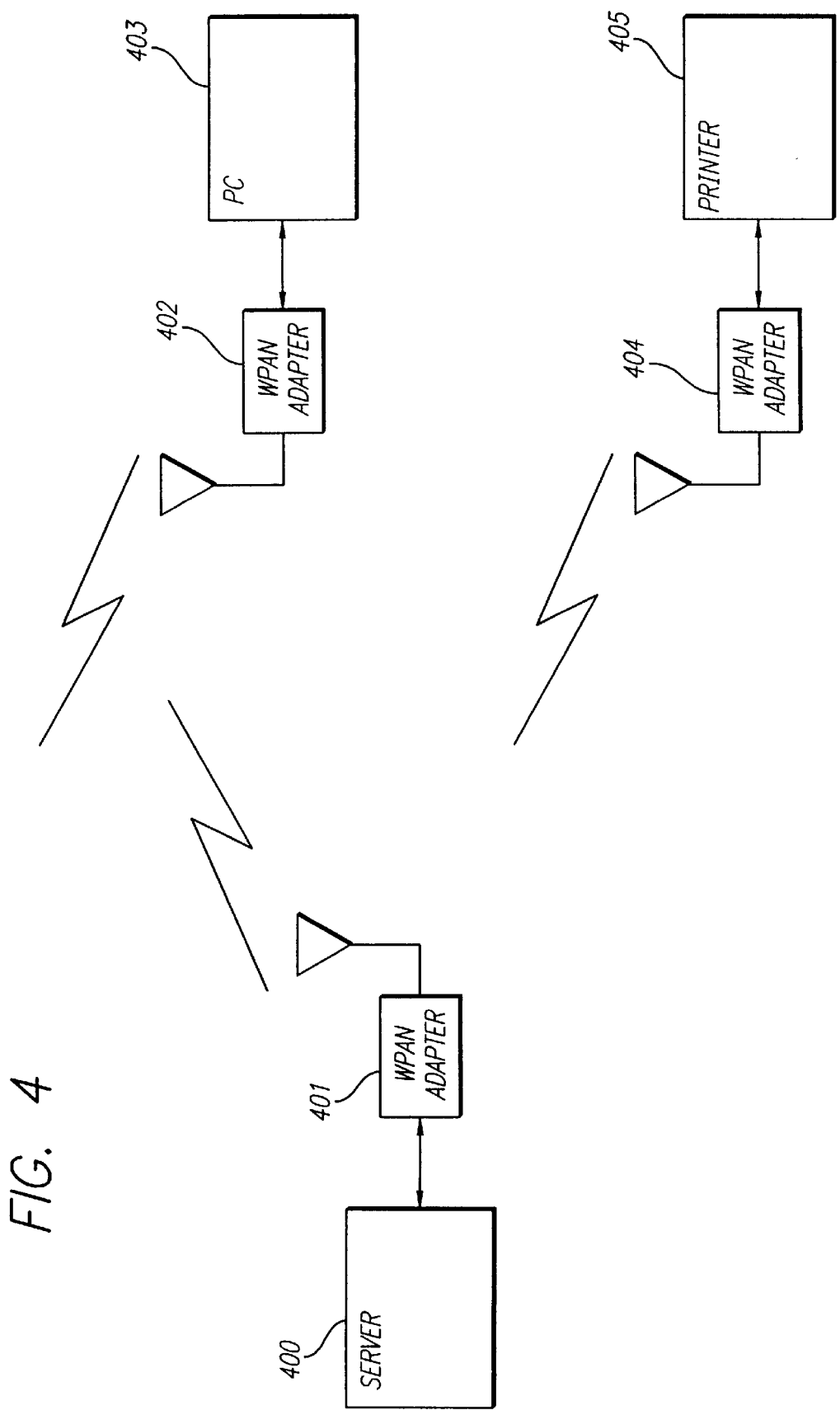
FIG. 4 is a block function diagram of a preferred embodiment of a wireless PAN adapter network that includes, at each site, a preferred embodiment of the wireless PAN adapter.

FIG. 4 shows a typical WPAN adapter physical network configuration. PC 400 is physically connected to WPAN adapter 401. This system is linked to two other systems comprised of a PC 403 and WPAN adapter 402, and a printer 405 and WPAN adapter 404.

Figures 1, 5:
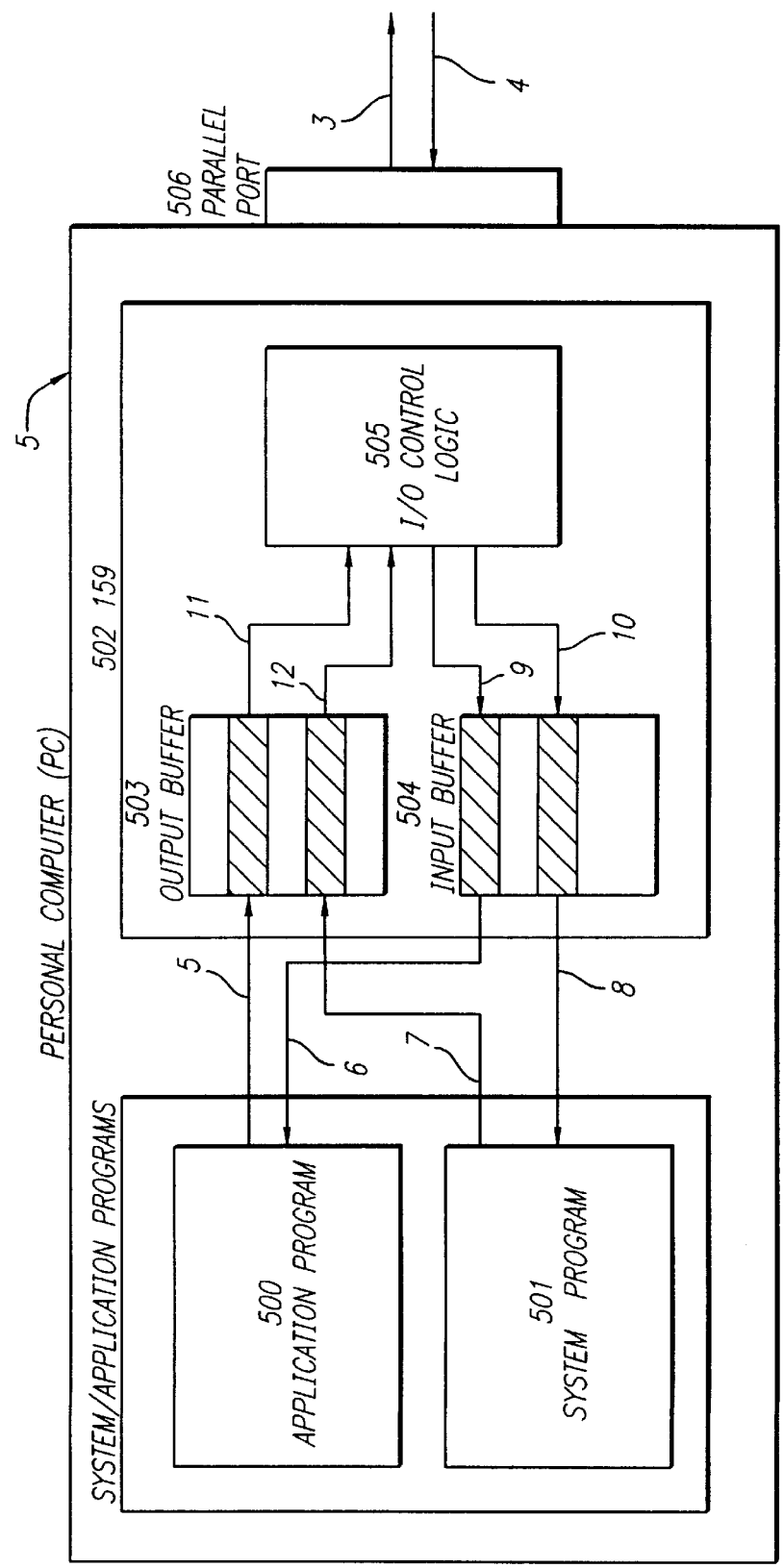
FIG. 5 is a block function diagram of a preferred embodiment of a wireless personal area network (PAN) adapter.
Figures 2, 5:
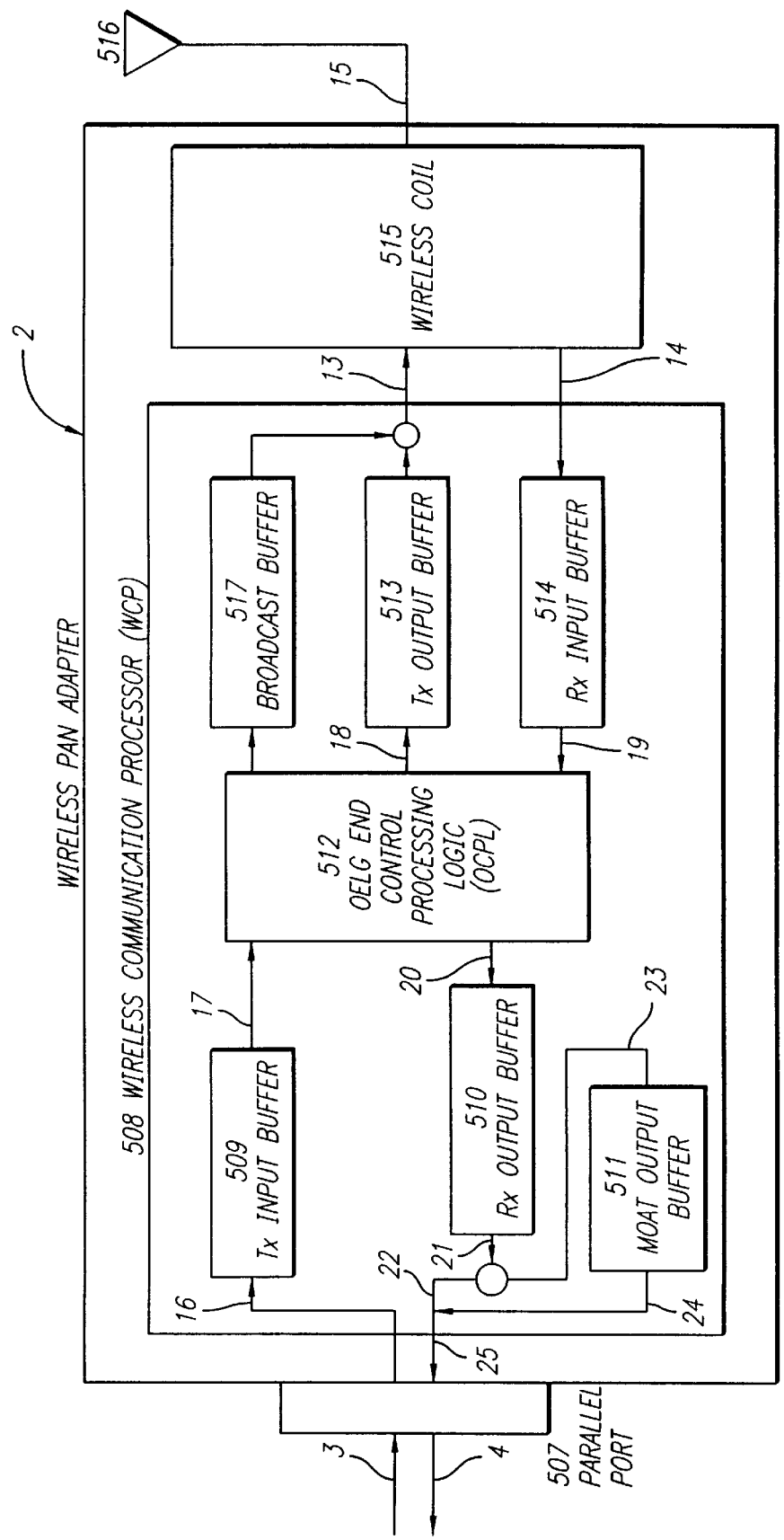

FIG. 5 is a functional diagram of a wireless personal area network (PAN) system that includes WCP 508 and its embodiment as a WPAN adapter 2. In FIG. 5, adapter 2 transmits data to and receives data from personal computer (PC) 5 via data lines 3 and control lines 4, and through parallel ports 506 and 507.

PC 5 includes application program 500 and operating system (OS) program 501 residing in RAM. Both types of programs receive data from input buffer 504 and transmits data to output buffer 503. The input buffer 504 receives data from I/O control logic data paths 9/10. Data path 9 passes the data from I/O control logic 505 that is transferred to the input buffer 504 and then to the application program 500 through data path 6. Data path 10 passes the data from I/O control logic 505 that is transferred to the input buffer 504 and then to the OS program 501 through data path 8. The output buffer 503 passes data through I/O control logic paths 11/12. Data path 5 passes data from the application program 500 to the output buffer 503, and then to I/O control logic 505 through data path 11. Data path 7 transmits data from the OS program 501 to the output buffer 503, and then to I/O control logic 505 through data path 12. Data transfer on paths 9, 10, 11 and 12 occur within the TSR device driver 502 RAM. Data transfer on paths 5, 6, 7, and 8 occur between the TSR 502 and OS/application programs 500/

501. All transferred between the WPAN adapter 2 and PC 5 passes from the PC 5 I/O control logic 505 bidirectionally through the PC parallel port 506.

WPAN adapter 2 is comprised of two components: a WCP 508 and a wireless unit 515. The WCP 508 includes a Tx input buffer 509, an Rx output buffer 510, a host output buffer (HOB) 511, a data and control processing logic (DCPL) 512, an Rx input buffer 514, a Tx output buffer 513, and a broadcast buffer 517. The Tx input buffer (TxIB) receives data from the parallel port 507 through data path 16, and transfers its data to the DCPL 512 via data path 17. The Rx output buffer (RxOB) 510 transfers data from the DCPL 512 to either the parallel port 507 through data paths 21, 22, and 25, or to HOB 511 through data paths 21 and 23. (If the RxOB overflows, data is transferred to the HOB 511). The HOB 511 transfers data to the parallel port via data paths 24 and 25. The DCPL 512 transfers data to either the broadcast buffer 517 through data path 18b, or the Tx output buffer (TxOB) 513 through data path 18a. The DCPL 512 receives data from the Rx input buffer (RxIB) via data path 19. Both the broadcast buffer 517 and TxOB 513 transfer data to the wireless unit 515 through data path 13. RxIB receives data from the wireless unit 515 via data path 14. For an RF configuration, an RF unit antenna 516 passes data to and receives data from an RF wireless unit 515 via data path 16.

When a system program 501 and/or an application program 500 is executed, program 500/501 asks the TSR (Terminate and Stay Resident System) 502, which includes output buffer 503, input buffer 504 and I/O control logic 505, for the address of the buffer to be used. Program 500/501 can ask for more than one buffer. There are fifteen output buffers 503 and fifteen input buffers 504, but there can be more of each, if desired. Each input buffer and each output buffer can hold one frame. A frame is a sequence of bytes. When TSR 502 receives a request from program 500/501, TSR 502 checks for an open buffer. If so, TSR 502 returns a buffer number, meaning a local address, if available, or, in the case of an error, TSR 502 returns an error code. TSR will check with WCP to verify that the address is valid for use. If the request is for a specific buffer number, TSR 502 checks to see whether that buffer is available. Once a buffer is set up, program 500 can send a stream of data or a control command to WCP 508.

The TSR remains resident in memory after termination of a program, and is used in applications such as device drivers and memory management programs. Here, TSR receives a frame of data as follows. The TSR informs the WCP that the PC is ready to receive by setting the signal SLCT IN (SELECT INPUT) high. (Signal names and bit positions are standard parallel port designations). This setting is made at installation, and is reset whenever the TSR transitions to the IDLE mode. The WCP sends one nibble at a time, first a low-order nibble (first half of a byte), then a high-order nibble (second half of a byte). Each nibble is strobed in by setting the ACK signal low. When the TSR is triggered by the signal IRQ7, TSR sets itself in the RECEIVE mode. The TSR acknowledges each nibble by strobing it back. The BUSY, PE (paper error), SLCT OUT (SELECT OUTPUT), and ERROR status lines contain the data nibble.

The TSR keeps track of which nibble, high or low, that the TSR is receiving for each byte. PE, SLCT OUT and ERROR are bits 5, 4 and 3, respectively, of the parallel port status byte. To strobe back the data as a nibble, these bits are shifted into positions 2, 1 and 0 in the parallel port data register. The busy bit must be inverted and placed in a bit position 3. Since the data is strobed back in a low nibble, bits 4–7 are set to 0. The TSR stores the first byte in operation code, the second byte in local address (LA), and the third byte in number of data (NDB) bytes (e.g., 210). Once it receives the header bytes, it knows the proper destination (LA), the TSR places the header and remaining data bytes in the receive buffer of the destination. When TSR has received NDB data bytes (e.g., 210), the TSR sets itself back to IDLE mode.

Figure 9A:
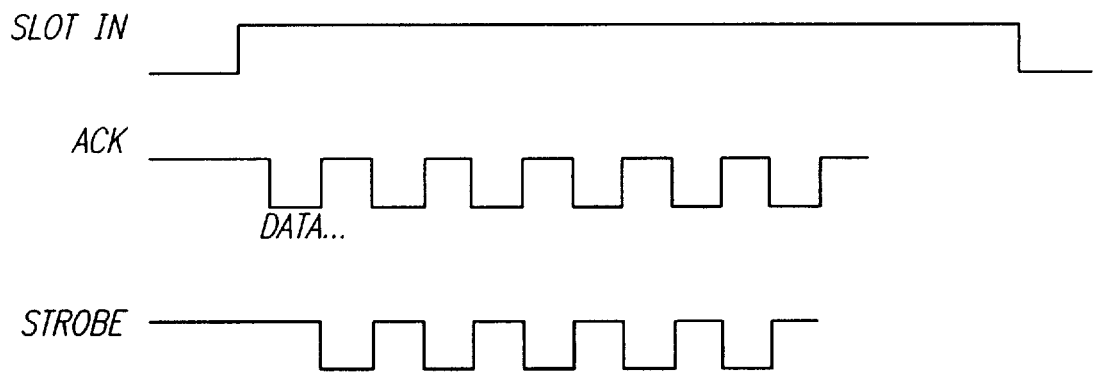
FIGS. 9A and 9B show the timing diagrams of signals for a preferred embodiment of a Terminate and Stay Resident (TSR) system for use with the preferred embodiment of the WPAN adapter.
Figure 9B:
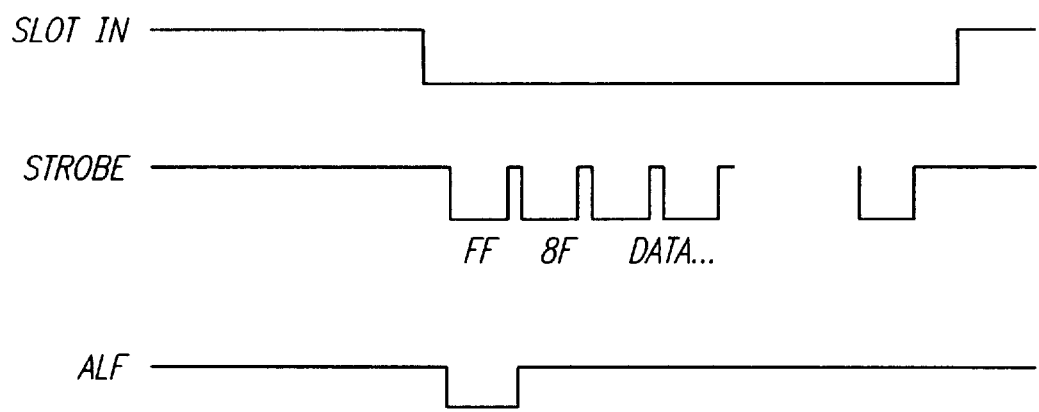

The TSR transmits data to WCP, frame by frame, in the following way. As soon as TSR knows that it needs to send a frame to WCP because buffer is ready, TSR informs WCP that PC is busy, setting SLCT IN signal low. The TSR also sets itself in SEND mode. TSR then strobes out a sync character $FF_{hex}$ with auto line feed (ALF) low. When TSR receives a hardware ACK (acknowledge) from WCP, TSR checks the SLCT OUT and PE (paper error) status lines. If the status lines are such that PE is high and SLCT OUT is low, TSR considers the handshake a success. If the status lines do not meet this condition, the handshake fails. If the handshake succeeds, TSR strobes $8F_{hex}$ to WCP, setting ALF high again. If the handshake has succeeded, TSR expects to start sending a frame when TSR receives the next hardware ACK signal. TSR is triggered to send the Nth byte of data when it receives the N−1th ACK signal. When the correct number of ACK signals has been received, TSR writes a status out to the command-status area, and reverts to IDLE mode, setting SLCT IN high. If the handshake has failed, TSR transitions to IDLE mode. FIGS. 9A and 9B show the timing pattern of the signals where TSR is receiving data from WCP and the timing pattern where TSR is transmitting data to WCP, respectively.

Referring to FIGS. 4 and 5, if a program running on PC 400 wants to send a stream of data to another PC 403, the program first sends a frame of data to output buffer 503. Program 500/501 tells TSR 502 to begin transmission as soon as the output buffer 503 is ready. One byte at a time is sent from output buffer 503 to parallel port 506. The parallel port of PC 400 is connected to parallel port 507 of WPAN adapter 401 via a parallel path.

When a byte of data is received in parallel port 507 along with a strobe enable, the strobe enable generates an interrupt to WPAN adapter 401. DCPL 512 in WCP 508 stores a byte of data in Tx input buffer 509, and sends an ACK (acknowledge) signal to the I/O control logic 505, acknowledging receipt of the data. In turn, PC 400 is interrupted, and sends the next byte to adapter 401. This process repeats until all bytes in a frame have been transferred. The PC (Host) to WCP frame format is shown in FIG. 6A. Tx input buffer 509 can store multiple frames. Buffer size can increase or decrease, depending on user requirements.

When DCPL 512 senses that a frame is ready in Tx input buffer 509, by reading the operation code of the frame, DCPL 512 knows to transfer the frame of data to Tx output buffer 513, and initiate a byte-at-a-time transfer to the wireless unit 515. To accommodate multi-point communication, there are four Tx output buffers 513, but these can be expanded or contracted, depending on use. Each Tx output buffer 513 contains a frame having the frame format shown in FIG. 6B.

Wireless unit 515 can be based on either infrared (IR) or radio frequency (RF) transmission schemes. If using RF, data is then sent via antenna 516 by the RF unit. Data can be transmitted in either serial or parallel form between WCP 508 and wireless unit 515. After the command to switch frequencies to either a primary carrier or an associated secondary carrier is received and processed in the DCPL 512, RF Frequency selection is then accomplished within the wireless unit 515.

When remote WPAN adapter 402 receives a frame of data through wireless unit 515, the data is transferred to WCP 508. If the wireless unit is infrared, the unit performs synchronization in WCP 508. In the RF unit, synchronization is performed at the wireless unit 515. Incoming data is stored in Rx input buffer 514.

DCPL 512 starts processing the Rx input buffer 514 when the buffer is ready. Buffer 514 is ready after receiving the last byte of the frame being transmitted. A frame of data is then transferred to Rx output buffer 510. Depending upon the connection mode to the host, data is sent directly to the host if in the output mode, or to the host output buffer 511 if in the input mode. Here, WPAN adapter 402 is connected to PC 403, and therefore is in input mode. There is one host output buffer 511 that is 1,024 bytes long which can store multiple frames. Buffer size can be increased or decreased, depending on use.

If, when in the input mode, and DCPL 512 senses that parallel port 506 of PC 403 is not busy, DCPL 512 initiates sending a "lower nibble", meaning lower half of a byte, to parallel port 507. Parallel port 507 is connected via cable to parallel port 506 of PC 403. When a nibble is received in parallel port 506 with the ACK signal enabled, the ACK signal causes an interrupt to activate TSR I/O control logic 505. For each received nibble, TSR I/O control logic 505 returns the received nibble with the strobe enabled to the WCP 508. This strobe enable causes WCP 508 to be interrupted, thus activating DCPL 512. DCPL 512 then sends an upper nibble to parallel port 507. TSR I/O control logic 505 forms a byte by combining two nibbles together and stores it in TSR input buffer 504. The process repeats until all bytes in a frame have been transferred. The receiving program 500/501 then polls its input buffers to see if the buffers are ready. If ready, a frame of data is transferred from input buffer area 504 to the program area 500/501 and then the ready indicator is reset.

Figure 7A:
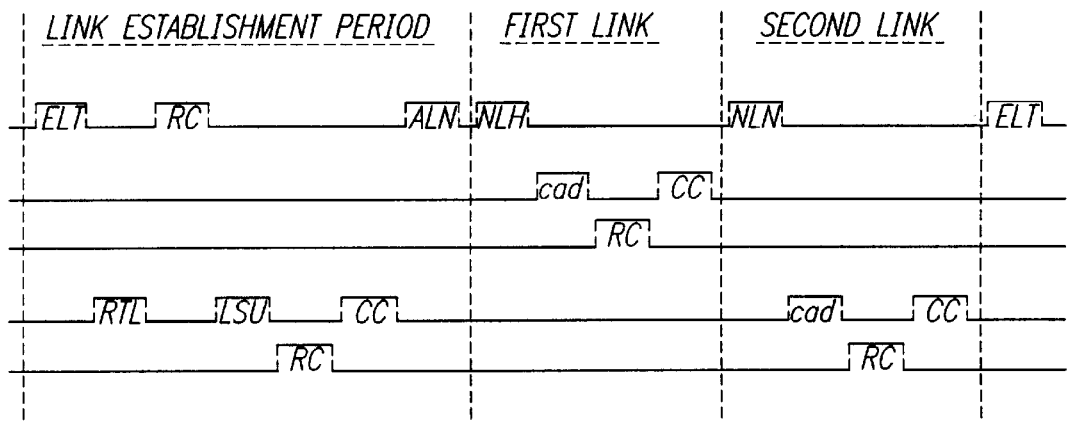
FIG. 7 shows a timing diagram for a communication sequence using the WCP.
Figure 7B:
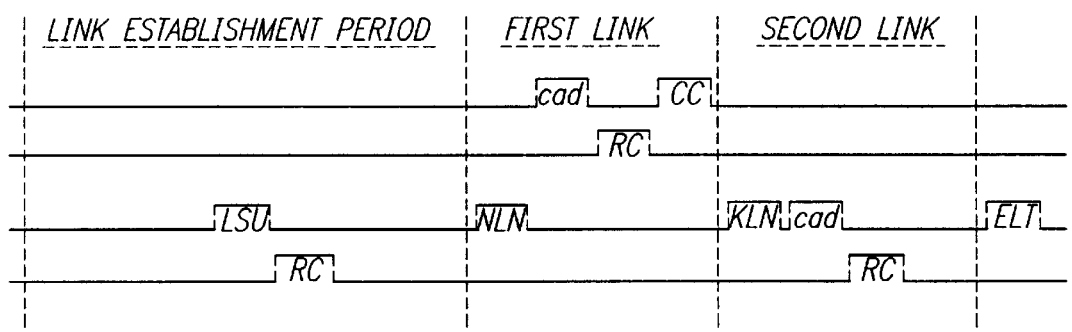
Figure 7C:
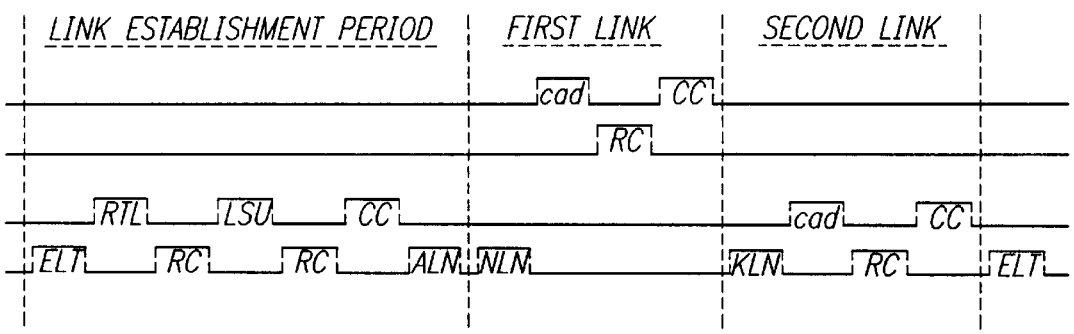

FIG. 7 shows an example of a typical frame sequence, assuming that a source (WCP Sx) and a destination (WCP Dx) are linked. When the Master Controller (WCP MC) is activated, the WCP MC starts sending a link establishment frame called the end-of-link table (ELT). When a source (WCP Sx) wants to establish a link to a destination (WCP Dx), the WCP Sx receives the frame. WCP Sx responds by sending a request-to-link (RTL) frame to the WCP MC. WCP MC sends a Received Confirm frame (RC) to the WCP Sx requester. If WCP Sx receives either an error code from the WCP MC or no response from the WCP MC, WCP Sx aborts immediately and sends the abort frame to the WCP MC. One reason for not receiving a response from WCP MC is that WCP MC has received more than one RTL at the same exact time. A collision of RTLs may confuse the WCP MC. If so, the WCP MC negates all requests. If WCP Sx receives no response, then WCP Sx internally picks a random number in the range 0 to 7, and waits for that number of time ELT frames received before trying again.

After successful handshaking with the WCP MC, WCP Sx sends a link setup (LSU) frame to WCP Dx. WCP Dx checks for three things: (1) whether the requested buffer is busy; (2) whether all buffers are unavailable, which happens only when WCP Dx tries to pick a buffer address; and (3) whether the host of the WCP Dx is busy if the host is a sequential device. If an error condition occurs, an error code is sent in a status code of a receive/confirm (RC) frame.

If the status code contains no error, WCP Sx sends a command complete (CC) frame to the WCP MC. After receiving CC, WCP MC sends a link number with an assigned link number (ALN) frame to WCP Sx. WCP Sx saves this link number, and waits for the next link number (NLN) frame with its link number before sending its data.

After link establishment expires, WCP MC sends a sync frame called a Next Link Number (NLN) frame. Each NLN frame contains a link number. A frame can either be a command frame or a data frame, as FIG. 7 shows.

Figure 8:
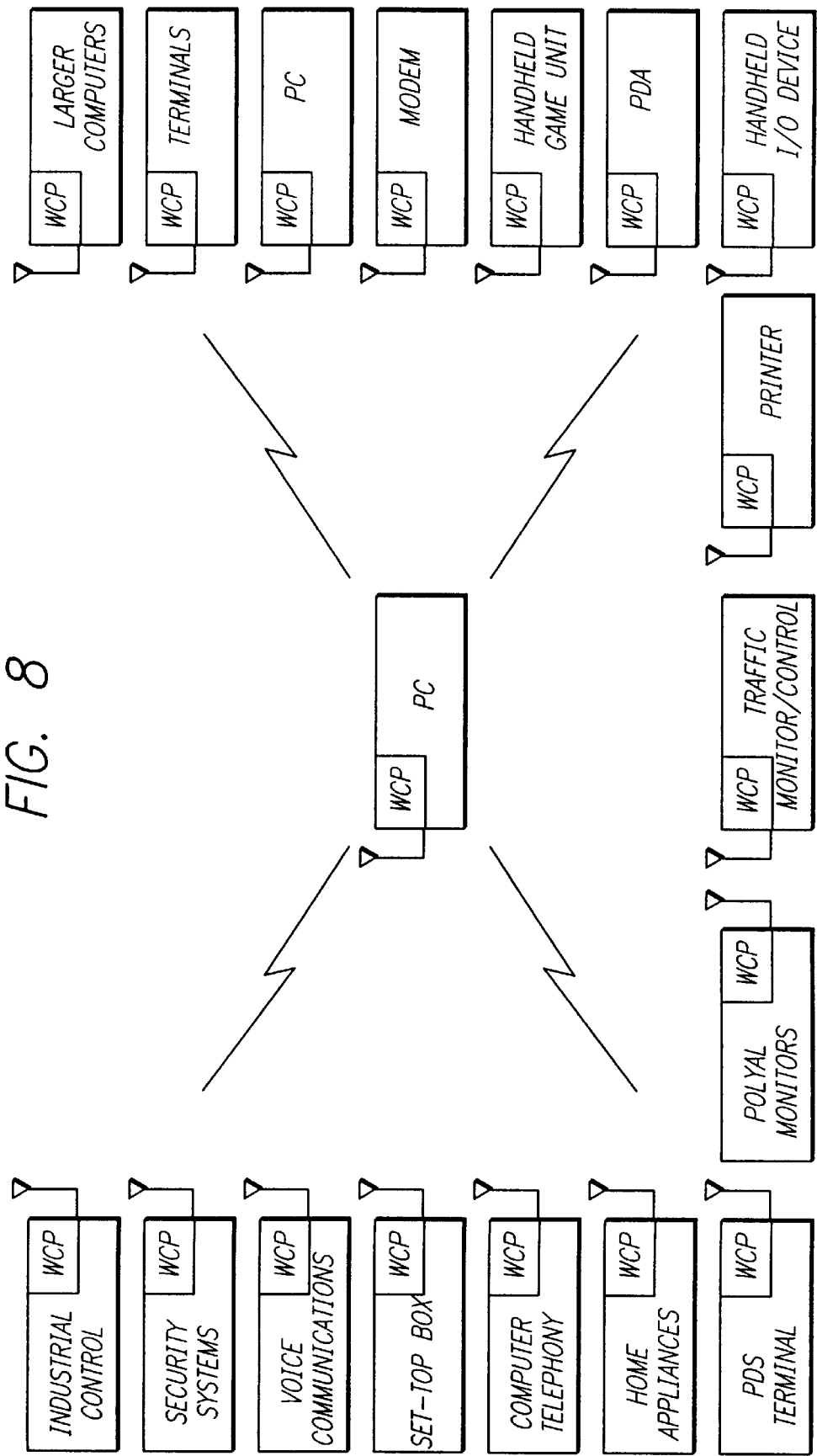
FIG. 8 shows, in block diagrammatic form, a wide variety of units that can transmit and receive data and control commands using a WCP.

FIG. 8 shows the types of devices that can be linked through a WCP-based Personal Area Network (PAN). In this figure, the WCPs are embedded in the host devices. As an alternative, the WCPs can be integrated into a WPAN adapter system and connected via parallel ports to host devices. Devices that may be linked include, but are not limited to: personal computers (desktop systems, personal digital assistants, notebooks, and pen-based computers), high performance computers (e.g., mainframes, minicomputers and workstations), peripherals (e.g., terminals, fax devices, input devices, modems, monitors, external storage devices, printers, plotters, scanners, security devices, and communication products), handheld game units, POS terminals, inventory control data input devices, patient monitors, home appliances, set-top terminals, industrial controllers, and personal communicators.

What is claimed is:

1. A wireless communication processor system includes at least two wireless communication processors (WCPs), said at least two WCPs each being associated with a host unit, each of said WCPs including: means for selecting or deselecting any WCP in the system to control establishing communication links between and among WCPs in said system; means for wireless transmission of data and control commands to another WCP; means for receiving wireless transmission of data and control commands from another WCP; means for transmitting data and control commands between each WCP and its associated host unit, if any; means for establishing a first link for wireless communication between at least two of said WCPs; means for maintaining said first link while data and control commands are communicated between and among linked WCPs; and means for establishing and maintaining additional links between any WCP in said system and any of said WCPs in said first link while said first link is maintained.

2. The system of claim 1 further comprising, in each WCP in said system, means for selecting and adapting frame length for data and control commands to be communicated between and among the linked WCPs.

3. The system of claim 1 further comprising, in each WCP in said system, means for selecting and adjusting frame format for communication of data and control commands between and among linked WCPs.

4. The system of claim 1 further comprising, in each WCP in said system, means for wirelessly re-transmitting data and control commands received by wireless transmission from at least one other WCP.

5. The system of claim 1 further comprising, in each WCP in said system, an RF transmission system or an IR transmission system to transmit and receive data and control commands between and among the WCPs in said system.

6. The system of claim 1 further comprising, in each WCP in said system, means for broadcasting data and control commands from one WCP in said system to at least one other WCP in said system.

7. The system of claim 1 further comprising, in each WCP in said system, means for receiving wireless transmission of computer programs and means for executing said computer programs in a receiving WCP.

8. The system of claim 1 wherein at least one of said WCPs in said system is part of a single chip.

9. The system of claim 1 further comprising, in each WCP in said system, means for transmitting control commands to a target host unit associated with another WCP in said system for activating or deactivating execution of at least one program in said target host unit.

10. The system of claim 1 further comprising, in each WCP in said system, means for transmitting control commands to any other WCP in said system.

11. The system of claim 1 further comprising, in each WCP in said system, means for adjusting the power consumption of said WCP.

12. The system of claim 1 further comprising, in each WCP in said system, means for assigning a unique address to any WCP in said system.

13. The system of claim 1 further comprising, in each WCP in said system, means for encrypting and for decrypting data and control commands received or transmitted by any WCP in said system.

14. The system of claim 1 further comprising, in each WCP in said system, means for changing the transmission baud rate of any WCP in the system.

15. The system of claim 1 further comprising, in each WCP in said system, means for selecting and adjusting the default length of a frame, means for selecting and changing the default destination WCP when said system is in a data pass-through mode, and means for selecting and changing address user code, local code, RF channel number, broadcast group address and transmission baud rate for each WCP in the system.

16. The system of claim 1 further comprising, in each WCP in said system, means for changing the operation mode of any WCP in said system from input mode to output mode or from output mode to input mode.

17. The system of claim 1 further comprising, in each WCP in said system, means for transmitting broadcast data to another WCP in the system and for transferring control command to another WCP to establish a communication link between said another WCP and at least one other WCP in the system.

18. The system of claim 1 further comprising, in each WCP in said system, means to check the format, address and system access of wirelessly received data and control commands.

19. The system of claim 1 further comprising, in each WCP in said system, means for transmitting communication link setup establishment commands to at least one other WCP in the system for transmission of at least one frame of data or control commands to said at least one WCP.

20. The system of claim 1 further comprising, in each WCP in said system, means for detecting headers on data or control commands received wirelessly from other WCPs and associated host units, means for storing data or control commands in input buffers for a host unit associated with any WCP in the system, and means for sending data or control commands to a host unit associated with a WCP in the system.

21. The system of claim 1 wherein said host unit is selected from the group consisting of computers, printers, personal digital assistants, personal communicators, peripheral devices, display devices and data acquisition devices.

22. The system of claim 1 wherein, when said system is in the broadcast mode, said system includes means for repeating transmissions of data and control commands at time intervals sufficiently long to increase substantially the probable receipt of said transmissions at all target WCPs in the system.

23. The system of claim 1 further comprising, in each WCP in said system, means for loading at least one program into a WCP from an associated host unit for execution of said program in said WCP.

24. The system of claim 1 further comprising, in each WCP in said system, means for loading at least one program from an associated host unit into a WCP, and means for wirelessly transmitting said at least one program to at least one other WCP in said system for execution of said at least one program in said at least one other WCP.

25. The processor of claim 1 further comprising means for setting up communication from said processor to another of said processors via an RF secondary carrier or subchannel.

26. The system of claim 1 wherein said first link and said additional links are made on a primary carrier, said system further comprising means for assigning and logging the use of at least one secondary carrier by two other WCPs which are about to be engaged in communication.

27. A wireless communication processor system includes at least two wireless communication processors (WCPs), each associated with a host unit, each of said WCPs including: means for wireless transmission of data and control commands to at least one other WCP in said system; means for receiving wireless transmission of data and control commands from another WCP in said system; means for transmitting data and control commands between each WCP and its associated host unit; means for establishing a plurality of wireless communication links between at least two of said WCPs in said system; means for maintaining each communication link in said plurality of links for a time sufficient to complete a desired communication of data, control commands, or both, and thereafter to terminate said link; and means for communicating data and control commands over each link in said plurality of transmission links on a time division basis whereby at least one frame of data or control commands is transmitted on the first of said links, then at least one frame of data or control commands is transmitted in turn on each of the other links before another frame of data or control commands is transmitted on the first of said links.

28. The system of claim 27 further comprising means for multiple processors to be communicating with multiple other processors via the use of one or more secondary carriers concurrently.

29. The system of claim 27 further comprising means for setting up communication from said processor to another of said processors via an RF secondary carrier or sub-channel.

30. The system of claim 27 wherein said first link and said additional links are made on a primary carrier, said system further comprising means for assigning and logging the use of at least one secondary carrier by two other WCPs which are about to be engaged in communication.

31. A wireless communication processor system includes at least two wireless communication processors (WCPs), at least two of said WCPs each being associated with a host unit, each of said WCPs including; means for wireless transmission of data and control commands to another WCP; means for receiving wireless transmission of data and control commands from another WCP; means for transmitting data and control commands between each WCP and its associated host unit, if any; means for establishing a first link for wireless communication between at least two of said WCPs; means for maintaining said first link while data and control commands are communicated between and among linked WCPs; and means for establishing and maintaining additional links between any WCP in said system and any of said WCPs in said first link while said first link is maintained; said system further comprising, in each of said WCPs, means for selecting and adjusting the default link of the frame, means for selecting and changing the default destination WCP when said system is in a data pass-through mode, and means for selecting and changing address user code, local code, RF channel number, broadcast group address, and transmission baud rate for each of said WCPs.

32. A wireless communication system including a plurality of host units, at least two of said host units including a wireless communication processor, each of said WCPs including: means for wireless transmission of data and control commands to another WCP; means for receiving wireless transmission of data and control commands from another WCP; means for transmitting data and control commands between each WCP and its associated host unit, if any; means for establishing a first link for wireless communication between at least two of said WCPs; means for maintaining said first link while data and control commands are communicated between and among linked WCPs; and means for establishing and maintaining additional links between any WCP in said system and any of said WCPs in said first link while said first link is maintained; said system further comprising, in each of said WCPs, means for selecting and adjusting the default link of the frame, means for selecting and changing the default destination WCP when said system is in a data pass-through mode, and means for selecting and changing address user code, local code, RF channel number, broadcast group address, and transmission baud rate for each of said WCPs.

* * * * *